(12) United States Patent
Cotter et al.

(10) Patent No.: US 6,959,151 B1
(45) Date of Patent: Oct. 25, 2005

(54) COMMUNICATION NETWORK

(75) Inventors: David Cotter, Woodbridge (GB);
Julian K Lucek, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/958,845

(22) PCT Filed: May 5, 2000

(86) PCT No.: PCT/GB00/01744

§ 371 (c)(1),
(2), (4) Date: Oct. 15, 2001

(87) PCT Pub. No.: WO00/69126

PCT Pub. Date: Nov. 16, 2000

(30) Foreign Application Priority Data

| May 11, 1999 | (EP) | ................................... 99303672 |
| Aug. 12, 1999 | (GB) | ................................... 9919095 |
| Dec. 22, 1999 | (GB) | ................................... 9930373 |

(51) Int. Cl.[7] .................. H04B 10/08; H04B 10/20; H04L 12/43; H04L 12/56; H04Q 11/00
(52) U.S. Cl. ..................... 398/54; 398/53; 398/52; 398/45; 398/79; 398/83; 370/412; 370/392; 370/535
(58) Field of Search ............. 398/45, 52, 53, 398/54, 58, 59, 79, 82, 83; 370/412, 468, 370/392, 535, 428, 390, 432

(56) References Cited

OTHER PUBLICATIONS

"New structures of the optical node in multihop transparent optical networks with deflection routing"; Bononi et al.; INFOCOM '94, Networking for Global Communications, 13th Proceedings IEEE, Jun. 12-16, 1994; vol. 1, pp. 415-422.*

"Packet synchronization for synchronous optical deflection-routed interconnetion networks", Feehrer et al.; Parallel and Distributed Systems, IEEE Transactions on, vol. 7, Issue 6, Jun. 1996, pp. 605-611.*

"BER performance of multiwavelength optical cross-connected networks with deflection routing"; Castanon et al.; Communications, IEE Proceedings, vol. 144, Issue 2, Apr. 1997, pp. 114-120.*

* cited by examiner

Primary Examiner—M. R. Sedighian
Assistant Examiner—Nathan Curs
(74) Attorney, Agent, or Firm—Nixon & Vanderhye P.C.

(57) ABSTRACT

A node in an optical communications network receives optical packets at its input. It determines a priority assigned to each optical packet. When the optical packet is a transit packet destined for another node then, if the packet is determined to have a relatively higher priority, it is output from the node via a continuous-flow transmission path. Other transmit packets having relatively lower priorities are sent via an alternative transmission path that may include queues or buffers resulting in a variable delay.

10 Claims, 19 Drawing Sheets

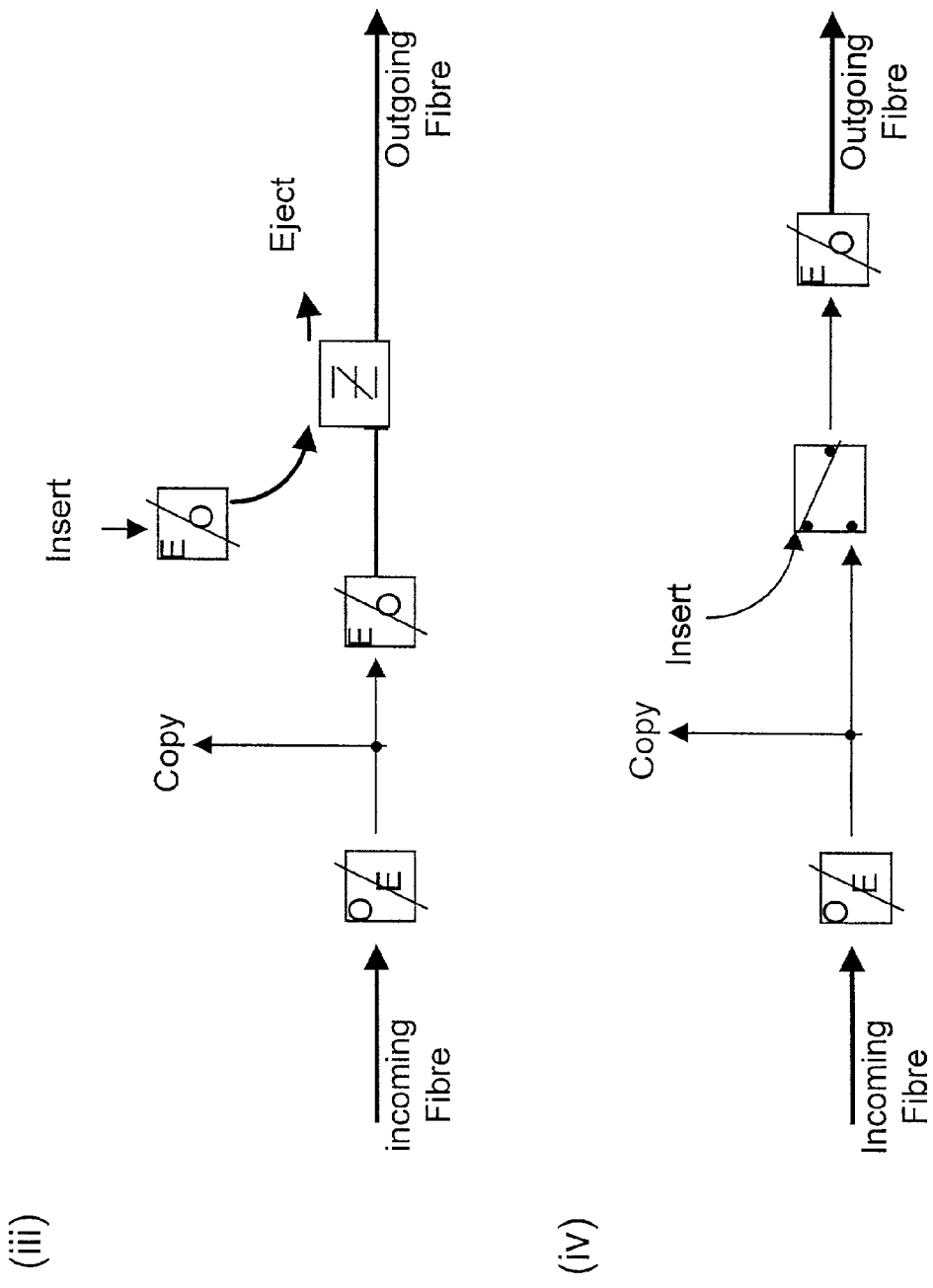
Figure 7(iii), 7(iv)

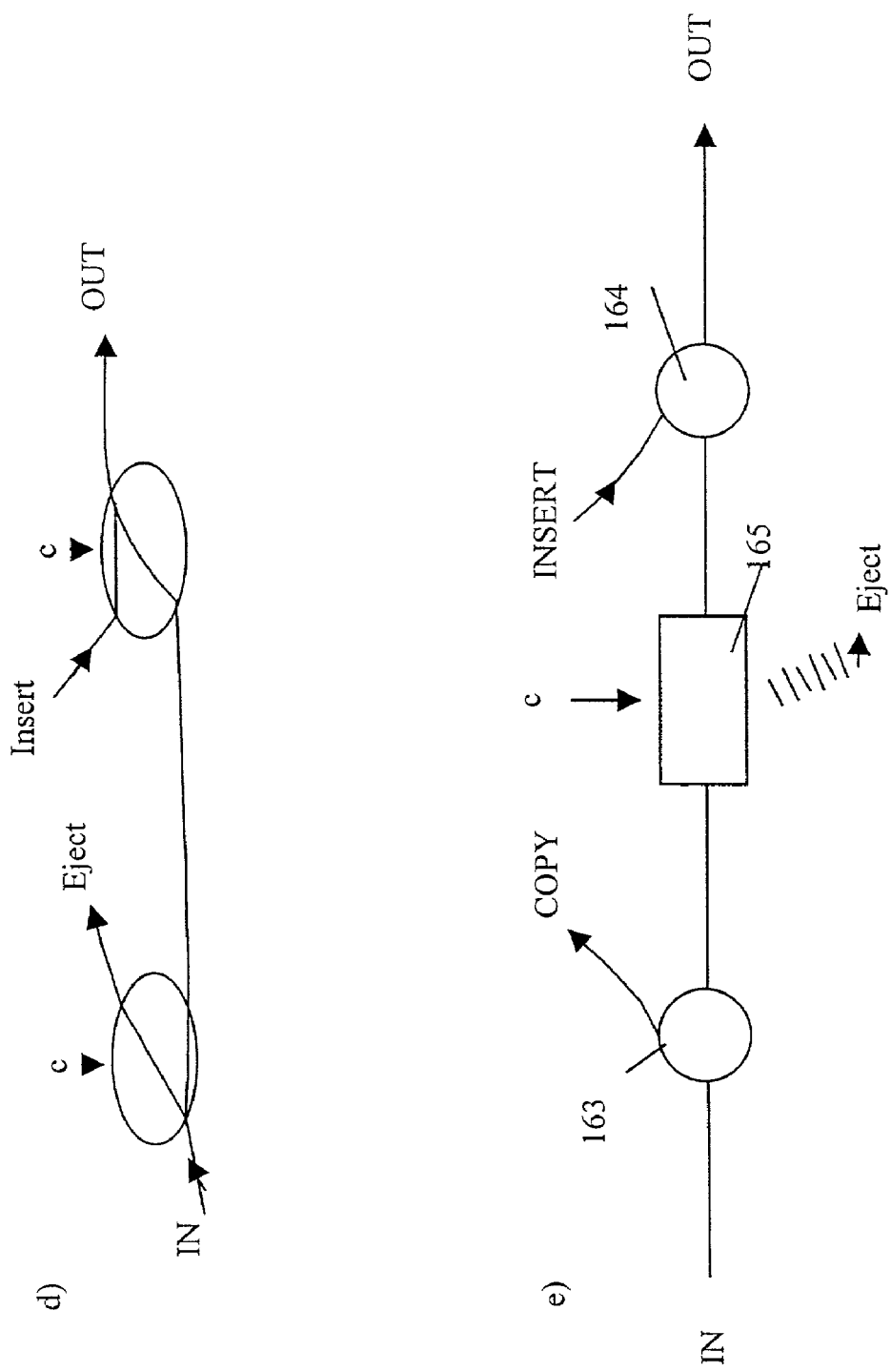

COMMUNICATION NETWORK

This application claims the benefit of priority under 371 to PCT/GB00/01744, which was filed in the English language on 5 May 2000, which claims the benefit of priority to European Patent Office Application 99303672.2, filed in the English language on 11 May 1999, to United Kingdom Application 9919095.1, filed in the English language on 12 Aug. 1999, and to United Kingdom Application 9930373.7, filed in the English language on 22 Dec. 1999.

BACKGROUND OF THE INVENTION

Field of the Invention

The present invention related to a communications network, and in particular to a broadband optical network carrying optical packets.

Optical broadband networks have been deployed to meet the rapid increase in demand for bandwidth arising from the growth in the Internet and related data services. Conventionally, packets have been encapsulated for transmission using broadband network protocols such as ATM (Asynchronous Transfer Mode) or SDH (Synchronous Digital Hierarchy). However, it has been recognised that this introduces a redundant layer of network processing and management and that it would be desirable to transmit packets directly over the optical transmission medium. For example, Cisco have proposed an "Optical Internetworking Roadmap" which describes five stages of evolution from data traffic being carried over SDH/SONET equipment through to full optical internetworking. The penultimate stage of this road map has been reached with Cisco's introduction of architecture known as a "Dynamic Packet Transport" (DPT) technology. This uses a ring architecture in which packet routers are placed on two concentric counter-directional rings. The rings consist of optical fibre links, each of which terminate at the input and output ports of the routers. DPT operates by sending data packets in one direction and by sending the corresponding control packets in the opposite direction on the other fibre.

BRIEF SUMMARY OF THE INVENTION

According to a first aspect of the present invention, there is provided a method of operating a node in a communications network, comprising:
(a) receiving an optical packet at the node,
(b) determining a priority assigned to the optical packet,
(c) when the optical packet is determined to be a transit packet having a relatively higher priority, then outputting the packet from the node via a continuous flow transmission path,
(d) for at least some packets determined to have a relatively lower priority, transmitting the said packets through the node via an alternative transmission path including one or more queues.

The present invention provides a method of operating a node, which allows express packets, that is high priority transit packets, to flow past any intermediate routers between the source and destination. This gives the advantages of reduced traffic load at the router, greater throughput, reduced delay, and reduced delay variation. At the same time, the nodes remain capable of implementing queuing and statistical multiplexing of packets where required. Using the invention, express multicast control packets may be transmitted to implement time-critical network management operations, such as support recovery. The fixed speed-of-light latency of express packet transfer also benefits time-critical applications such as distributed database concurrency. It also enables advanced latency-management techniques.

A continuous-flow transmission path is one which transmits packets in a steady, continuous fashion without using queues or other variable delays. The continuous-flow transmission path may be entirely in the optical domain. Alternatively, part or all of the continuous-flow transmission path may be in the electrical domain. In this case, electrical-optical conversion will be carried out at the input and output to the node.

According to a second aspect of the present invention, there is provided a node for connection in a communications network, the node comprising a continuous-flow transmission path connecting the input to the node to the output from the node,
an alternative path connecting the input to the node to the output from the node and including one or more packet queues, and
control means arranged to determine the priority assigned to a transit packet to direct a transit packet having a relatively higher priority via the continuous-flow transmission path, and to direct a transit packet having a relatively lower priority via the alternative transmission path.

According to a third aspect of the present invention, there is provided a method of operating a node in a communications network, comprising
(a) receiving a packet in the optical domain at an input to the node,
(b) creating a copy of the packet,
(c) directing at least some of the transit packets received at the input of the node via a continuous-flow transmission path, to the output of the node.

Preferably, the node includes a switch connected to its output, and the method includes selectively ejecting at least some of the packets from the continuous-flow transmission path. This aspect of the invention provides a new node architecture termed by the inventors the "copy-eject-and-insert" (CEI) architecture. This architecture facilitates the transmission of high-speed multicast packets, and is also particularly suitable for use with the packet prioritisation scheme of the preceding aspects of the invention. In a conventional "drop-and-insert" (D&I) architecture, packets are extracted from the transmission path for the purpose of receiving them at a node. In the case of a CEI node embodying the invention, by contrast, packets are copied but not extracted from the transmission path when they are to be received by the node. All of the incoming traffic may be copied to the node, for example by means of a passive optical coupler. If an incoming packet has reached its destination or is otherwise intended to terminate at the node, then the packet may also be ejected from the transmission path, for example by means of a crossbar switch at the output of the node. When a multicast packet is received at the node, it may both be read from the copied packet and concurrently transmitted onwards via the continuous transmission path.

BRIEF DESCRIPTION OF THE DRAWINGS

Systems embodying the present invention will now be described in further details, by way of example only, with reference to the accompanying drawings in which:

FIG. 15b shows the format of a packet handled by the node of 15a; and

DETAILED DESCRIPTION OF EXEMPLARY EMBODIMENTS

Figure 1:
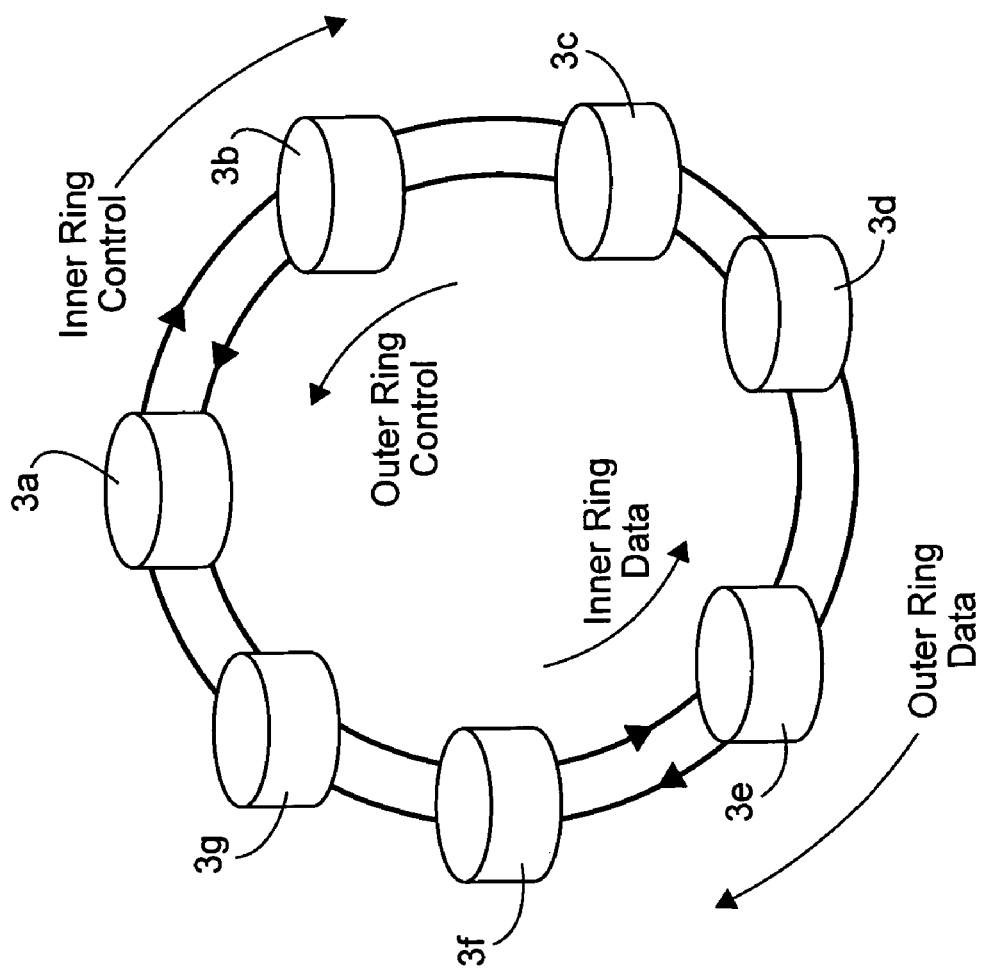
FIG. 1 is a schematic showing a prior art network.

FIG. 1 shows a prior art architecture developed by Cisco and known as the DPT (Dynamic Packet Transport) ring architecture. In this scheme, Internet routers are placed on two concentric counter-directional rings. The rings consist of a sequence of optical fibre links, each of which terminates at the input and output ports of the routers. One of the rings is known as the inner ring and the other as the outer ring. Data packets are sent in one direction and corresponding control packets are sent in the opposite direction on the other fibre. This IP (Internet Protocol) ring network is designed to provide a number of features. In particular, it supports statistical multiplexing of packets with no provision of point-to-point connections or use of dedicated bandwidth for interconnection of routers or for protection. It is also designed to support packet prioritisation and to offer multiple levels of queuing and scheduling and to support both unicast and multicast transmissions. In the network of FIG. 1, by contrast with the network described below with reference to FIG. 2, the signal transmission path is interrupted at each node.

Figure 2:
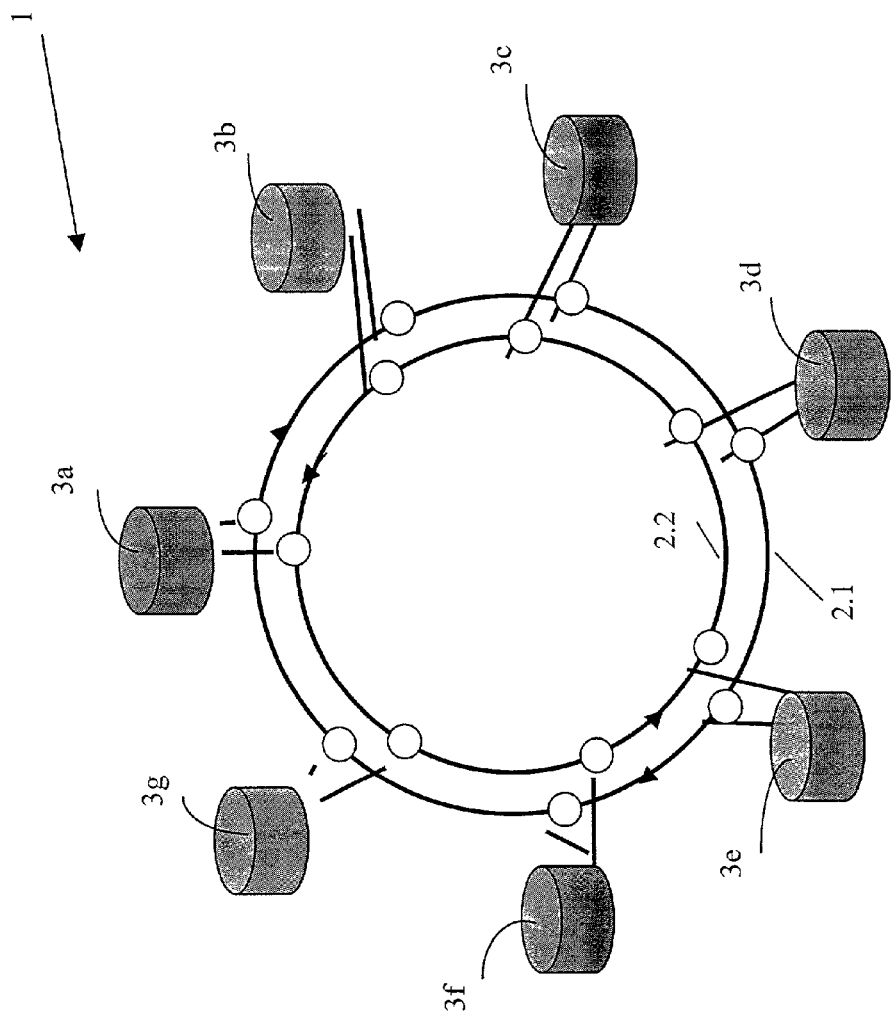
FIG. 2 is a schematic showing a first example of a network embodying the present invention.

FIG. 2 shows a network embodying the present invention. A communications network 1 comprises concentric outer and inner rings 2.1, 2.2. The rings carry optical packets. A number of nodes 3a to 3g is an Internet Protocol router. In operation, one of the routers, for example 3a, outputs an optical packet addressed to another of the routers, for example 3d, onto one of the dual concentric rings. The optical packet output by node 3a carries the network address of node 3d in an address field in the packet header. The packet passes around the ring. At each intermediate node, the packet address is compared with the address of the respective node. If the packet is not addressed to a given intermediate node, then the packet passes on to the next node, and so on. At the destination node, the address is read and the packet is recognised as being intended for receipt at that node. The packet, in the case of a unicast transmission is removed from the network at that node. It may then, for example, be converted to the electrical domain for onwards transmission to a customer terminal on an electronic network connected to the respective node.

Figure 3:
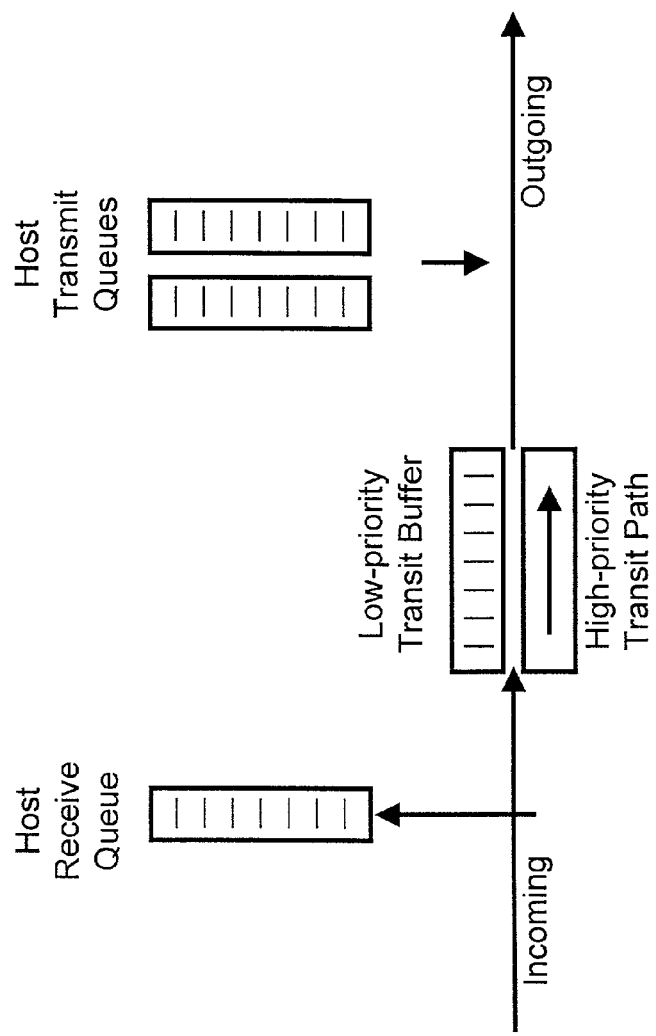
FIG. 3 shows the data flows through a node in the network of FIG. 2.

FIG. 3 shows the flow of received and transmitted data packets at one of the nodes on one of the fibre rings. An incoming data packet is (i) sent to host receive queue (if it has reached its destination) or (ii) is passed over for onward transmission. A multicast packet may both be sent to the host receive queue and also be forwarded for onward transmission. Packets for onward transmission are treated according to their priority: a low-priority packet is passed to a transit queue. An express high-priority, packet is passed immediately to the outgoing path without queuing. When capacity on the ring allows, a packet from one of the transmit queues may be passed to the outgoing path. Multiple transmit queues may be used to manage prioritisation of outgoing traffic from the node.

In this example, the optical fibre rings and the nodes are configured to provide a continuous optical path for express packets.

In a continuous transmission path signals stream into and out from the path at a continuous and uniform rate. The path may be a continuous optical transmission path. The continuous optical transmission path may contain a substantially fixed delay as in FIG. 3. In the case of a continuous transmission path in the electrical domain the path may contain storage elements such as an FIFO (first-in first-out) buffer. This differs from conventional systems, however, in this case, in that in normal operation, the output from the buffer is continuous and regular, so that the input and output of the buffer occur at substantially the same rate. In conventional prior systems, a buffer is sued to hold transit packets in a queue which is serviced at rates and/or times which are dependent on factors such as packet priorities, queue length, status of contending queues etc.

A further function carried out by the control circuits is to determine whether the time-to-live (TTL) of a packet has expired. If the time-to-live is determined to have expired, then again a control signal is sent to the switch to cause such a packet to be ejected from the onwards transmission path. When one of the nodes generates and outputs an optical packet onto the ring, a value is written in a phase field "PH" in the packet header. One of the nodes functions as a master node. The master node outputs multicast express control packets that travel around each ring to inform each node of the current phase value. The phase value is regularly updated, at a rate of at least once per round-trip time for speed-of-light travel around the ring. The updating of the phase value is carried out by the master node incrementing the value. For example, in the case of one control packet per round trip of the ring, the phase value is incremented by 1 (modulo 3). Each ring periodically receives and stores the current phase value as indicated by one of the multicast express control packets from the master node. When any other express packet is received at the node the control logic in the node determines whether the value in the PH field of the received express packet is such that:

(current_phase—PH) mod3>1

If this inequality is satisfied, then the packet is expired and should be purged from the ring. This may be the case, for example, because the packet is addressed to a node which is currently malfunctioning or because there is an error in the address of the packet.

Figure 4:
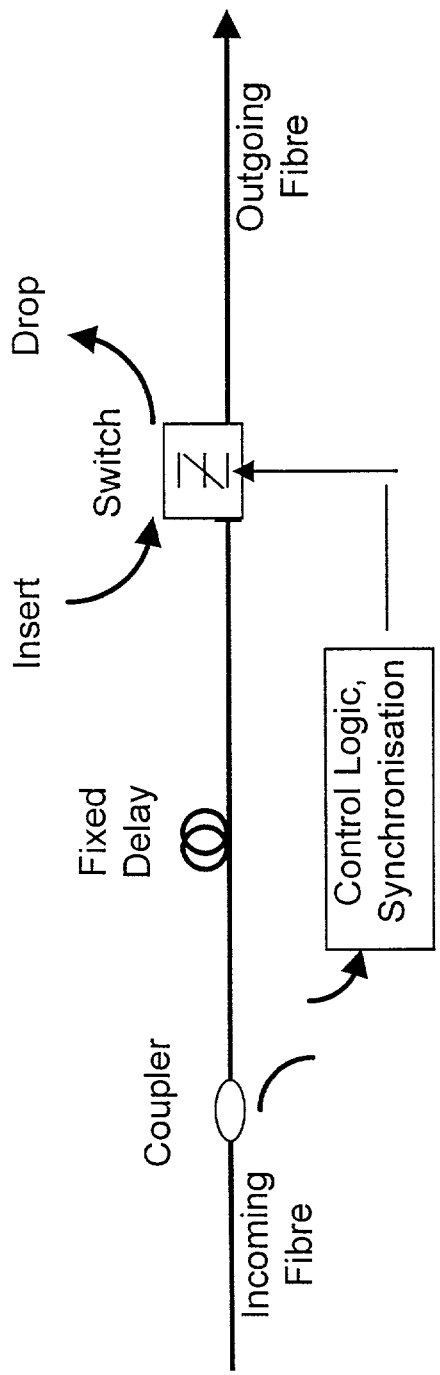
FIG. 4 is a schematic showing the architecture of a prior art node.

FIG. 4 shows the tradition 'drop-and-insert' (D&I) architecture that has been widely considered previously for optical packet networks (e.g. J R Sauer, M N Islan and S P Dijaili, "soliton ring network", Journal of Lightwave Technology, vol. 11, no. 12, December 1993, pp. 2182–2190). The node contains a 2×2 optical crossbar switch. When the switch is in the bar (straight-though) position: (i) an optical packet on the incoming fibre is 'dropped' (i.e. switched to the node receiver); or (ii) an optical packet created by the host transmitter is 'inserted' (i.e. switched to the outgoing fibre); or both (i) and (ii) occur simultaneously. A limitation of the D&I node architecture is that when a packet is received by the node it is physically removed from the optical path between the incoming and outgoing fibres. The only method for multicasting a packet is, at each node, to drop the packet and then subsequently reinsert it when sufficient vacant capacity on the ring becomes available. Therefore this architecture cannot support multicasting of express (high-priority) transit packets.

Figure 5:
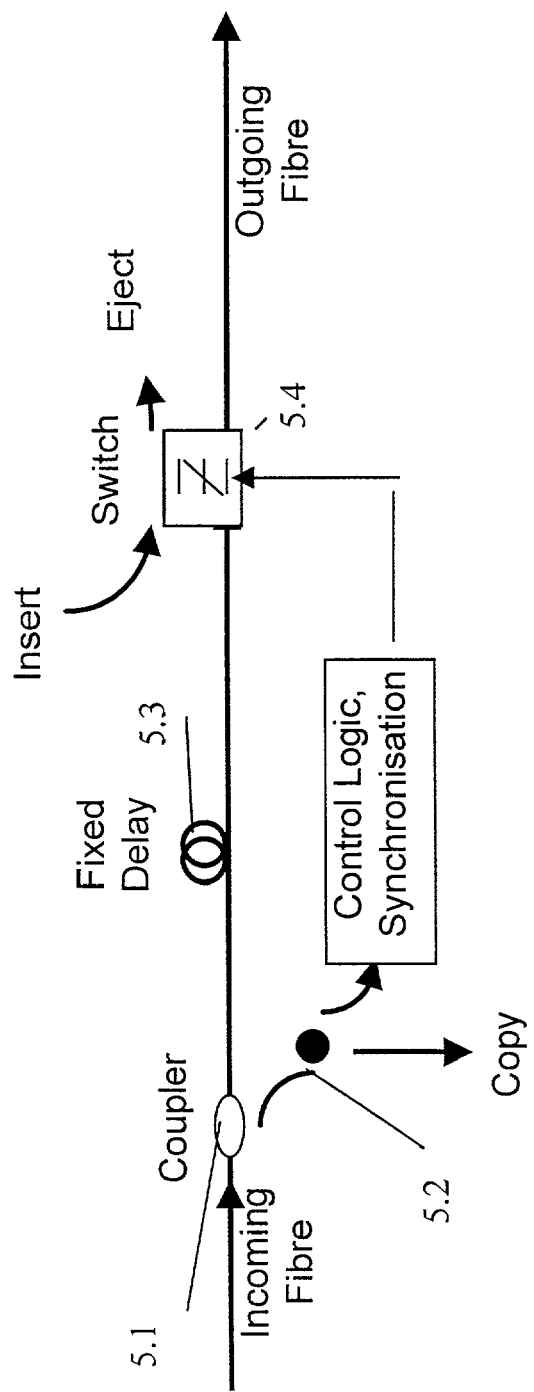
FIG. 5 is a schematic showing the architecture of a node embodying the present invention.

FIG. 5 shows a preferred form of the new node architecture that we have invented. Instead of 'drop-and-insert' (D&I), this new architecture provides the function of 'copy-eject-and-insert' (CEI). In the case of a D&I node, packets are extracted from the transmission path for the purpose of receiving them at a node. In the case of a CEI node, packets are copied by not extracted from the transmission path for the purpose of receiving them at a node. All incoming traffic is copied to the node, for example by means of a passive optical coupler as shown in FIG. 5. In use, an incoming fibre from one of the optical rings passes to a coupler 5.1. From the coupler 5.1, one optical path passes through a further length of fibre 5.3 providing a fixed delay to an optical crossbar switch 5.4. An outgoing fibre connected in the fibre ring passes from one of the output ports of the crossbar switch. The other output from the coupler 5.1 is split again, for example, using a further coupler 5.2. One branch of the output from this further coupler is used to provide a copy of the optical packet on the incoming fibre. This copy may be passed, for example, to the host receive queue. The other branch of the output of the further coupler passes to control circuits. These control circuits may, for example, read a header carried with the optical packet, and carry out associated logic operations. A control output is generated by the control circuits and passes to the crossbar switch. If the control circuits determine that the packet is addressed to the respective node, then the crossbar switch is set to the cross state in order to eject the packet (in the case of a unicast transmission). If an incoming packet has reached its destination or is otherwise intended to terminate at the node, the packet is also ejected from the ring, for example by means of the crossbar switch as shown in FIG. 5. Simultaneously, or whenever sufficient vacant capacity on the ring become available, a packet may be inserted onto the ring by the node. The control logic and synchronisation sub-systems use information contained in the packet (for example in the packet header) and other information (for example the status of transmit queues and the status of control flags) to operate the crossbar switch. FIG. 5 shows a fixed optical delay, which allows sufficient time for the operation of these control logic, synchronisation sub-systems and switch before the arrival of the packet at the switch. As in the D&I architecture, an express (high priority) transit packet is passed directly to the outgoing fibre. However, unlike D&I, the CEI architecture allows express transit packets to be multicast, because they are simultaneously copied without delaying their onward passage.

Figure 14:
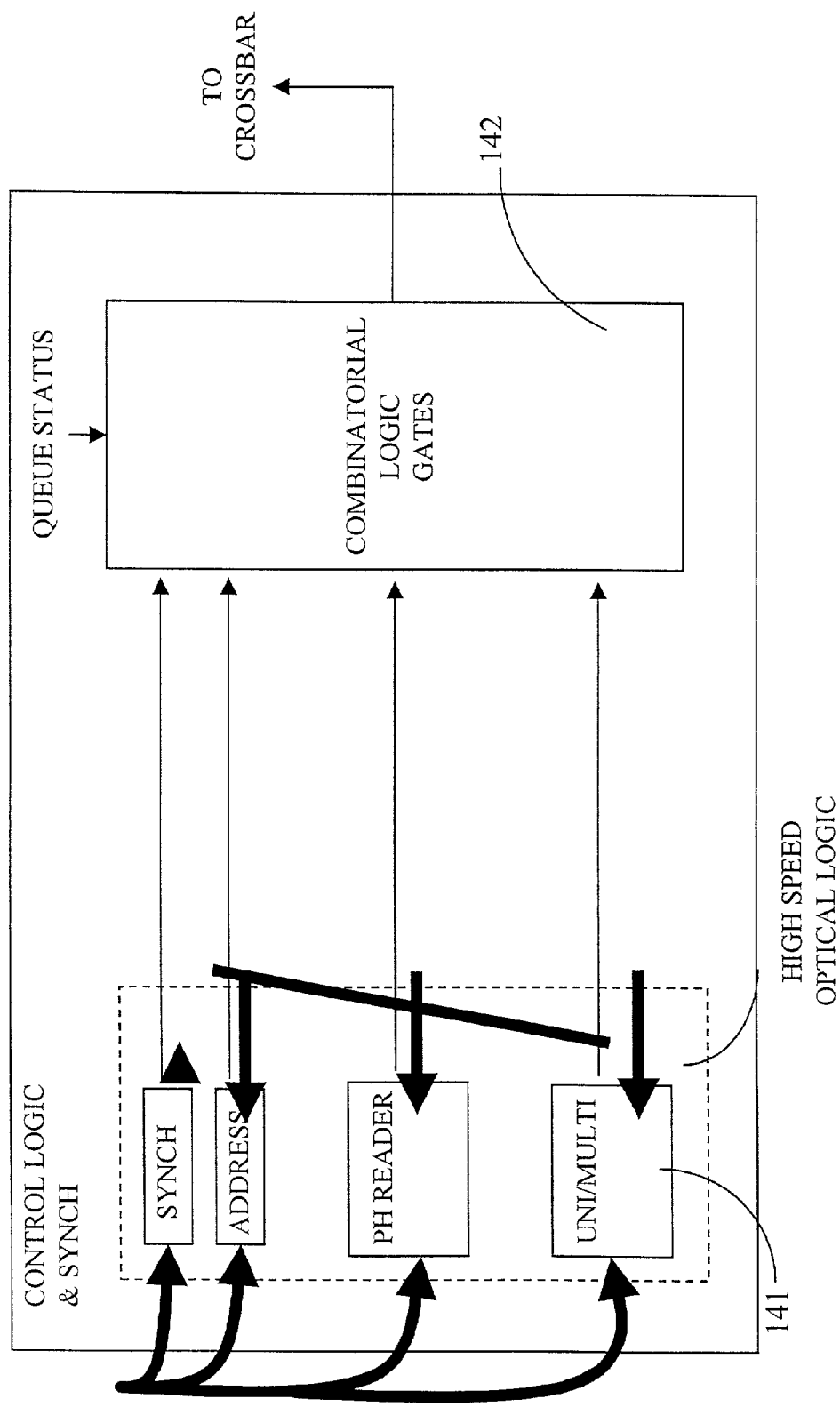
FIG. 14 shows logic and synchronisation circuits.

FIG. 14 shows the control logic subsystem in more detail. It includes optical logic stages 141 and combinatorial electronic logic gates 142. The four optical blocks (synch, address recognition PH reader and Unicast/Multicast) each have copies of the optical packet to the input. The output from the synchronisation block is an optical path to each of the other three optical blocks. The synch block may be based on one of the self-synchronisation techniques we have described in our patent EP-B-687370 (eg. using pulses separated by 1.5 bit periods input to an optical AND gate). The address recognition block may be based on the technique we have described before in that patent. Addresses are coded using specially selected binary words, and recognised by inputting address and target word to an optical AND gate. The output from the AND gate is converted to give an output from the block that is an electrical binary signal that says packet ADDRESSEE matches/does not match local address. The PH may be two optical AND gates, each having the optical packet as one input and a synch pulse as the other input—this synch pulse timed to overlap with one of the PH bits. The output from PH reader block is two parallel electrical binary signals—each denoting one of the PH bits. The UNI/MULTI reader may be one optical AND gate, having the optical packet as one input and a synch pulse as the other input—this synch pulse timed to overlap with the UM bit. The output from UNI/MULTI reader block is one electrical binary signal—denoting unicast/multicast. These electrical signals, together with signals from the queue status then pass to the high-speed electronic logic part. This part performs the logic which is set out in the table below describing the action of the node for various types of packet (e.g. multicast low-priority transit packet, etc). The output from this electronic logic is a binary electrical signal to set the 2×2 cross bar optical switch configuration.

Each stage of this logic has to operate within a time shorter than the shortest packet, e.g. for a 50 byte packet at 100 Gbit/s=4 ns. Since the optical stage and electronic logic stage are arranged in pipeline, each stage would have to take less than the minimum time (eg 4 ns). The optical stage is ultrafast—e.g. using four-wave mixing in semiconductor optical amplifier, or TOAD device, etc. to implement the optical AND gate. Since the electronic logic required is simple it is possible to construct suitable fast circuit using hard-wired combinatorial logic.

Figure 16:
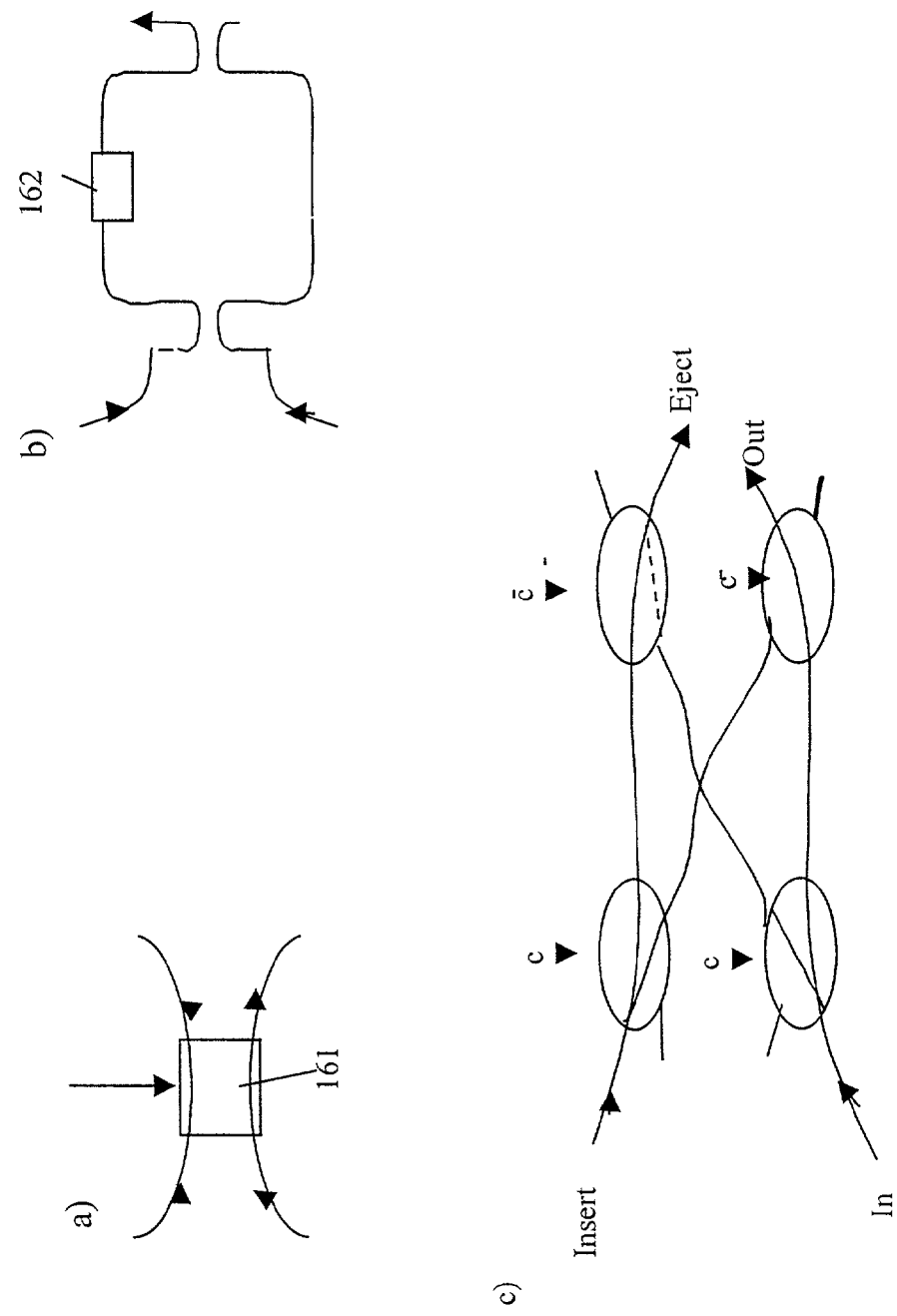
FIGS. 16a to 16e show crossbar switch structures.

FIG. 16a shows the design of a simple crossbar switch. This includes a region 161 of lithium niobate. When an electrical control signal is applied to a gate on the lithium niobate, then the refractive index of the lithium niobate changes, so that the optical signal is coupled across from one optical path to the other, the "cross" state of the switch.

FIG. 16b shows an alternative design for a crossbar switch. In this case, the switch uses a Mach Zehnder interferometer configuration with a control element 162 in one branch of the interferometer. A phase change is generated by the control element 162 when the control signal is applied, to switch the output from one optical output port to the other. Both of these designs suffer significant cross talk; that is, when an optical signal is switched to one of the ports, a significant level of optical power, for example 20 or 30 percent of the input power, is present at the other output port.

To overcome this problem, each crossbar switch in the nodes described above may be replaced by a network of four such switches in the configuration shown in FIG. 16c. The switches are cross-connected as shown. The control signal c is applied to the first pair of switches in the signal path, and the logical compliment of the control signal, $\bar{c}$ is applied to each of the second pair of switches in the signal path. Logically, the switching effect of such a network is equivalent to that of each the single switches of FIG. 16a or 16b. However, the crosstalk is reduced by an order of magnitude.

Since the crossbar switch required only two inputs, one for the insert path and one for the straight through path, and only two outputs, one for the eject path and one for the output path, it can be shown that the full network shown in figure c is not required. Instead, the full crossbar switching function with the benefit of crosstalk reduction can be achieved using a pair of cross bar switches connected in series as shown in FIG. 16d.

FIG. 16e shows a further alternative design also offering improved cross talk performance. This uses a pair of passive optical couplers 163, 164 with an electro-absorption modulator (EAM) 165 connected between them. The copy optical signal is taken from the first of the optical couplers 163 and the insert optical signal is added at the second of the optical couplers 164. In the absence of a control signal c, the EAM 165 is in its transparent state and the optical packet passes straight through from the input path to the output path. When a packet is to be ejected then the control signal c switches on the EAM 165. The ejected packet may then be replaced by further packet added on the INSERT optical path of the coupler 164.

Figure 6:
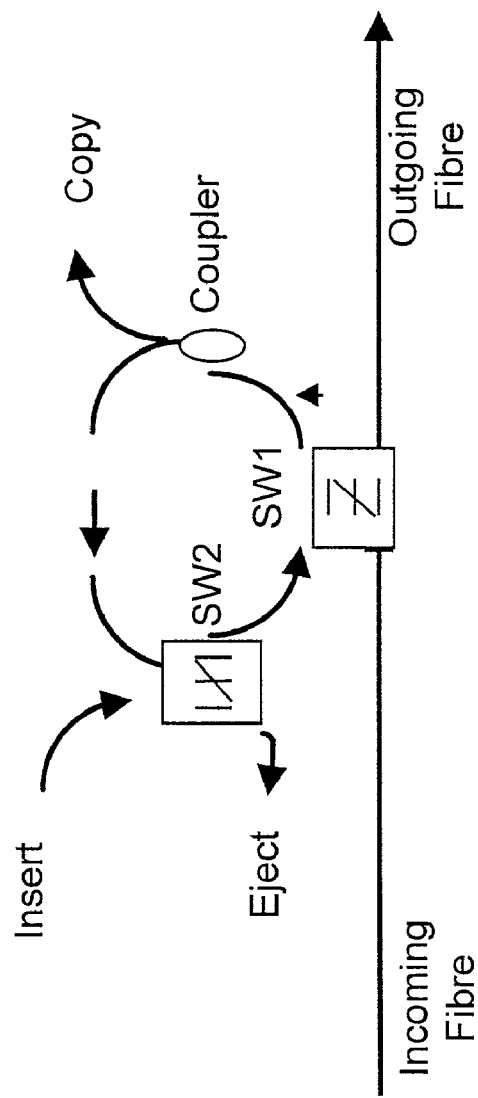
FIG. 6 is a schematic showing an alternative node architecture.

FIG. 6 shows an example of the CEI architecture in an alternative form. Here there are two crossbar switches, SW1 and SW2. (For clarity, the control logic and synchronisation sub-systems are not shown.) In this case not all incoming packets are copied; instead only those that arrive whilst SW1 is in the cross state will be copied. In this case an express multicase packet may be copied and immediately reinserted onto the ring if switches SW1 and SW2 are both placed in the cross state. However in this case the express multicast packet is delayed by the transit time of the feedback loop from SW1 to SW2 and back again to SW1. The alternative form of the CEI architecture shown in FIG. 6 has certain drawbacks: First, the forced additional delay for express multicast packets increases the probability of contention at SW1 (described further below) unless special preventative measures are used (such as, for example, providing a sufficient time guard band following an express multicast packet, with the resulting penalty of reduced network throughput and higher complexity). Second, the architecture shown in FIG. 6 requires two optical switches, rather than one.

In the case of the D&I architecture (FIG. 4), the extraction of packets from the transmission path for the purpose of receiving them at a node is necessarily a selective process in the optical domain, and may be performed for example by an optical crossbar switch. In the preferred form of the CEI architecture (FIG. 5), the copying of packets from the transmission path for the purpose of receiving them at a node is non-selective in the optical domain, and may be performed for example by a passive optical coupler.

Figures 7, 7I:
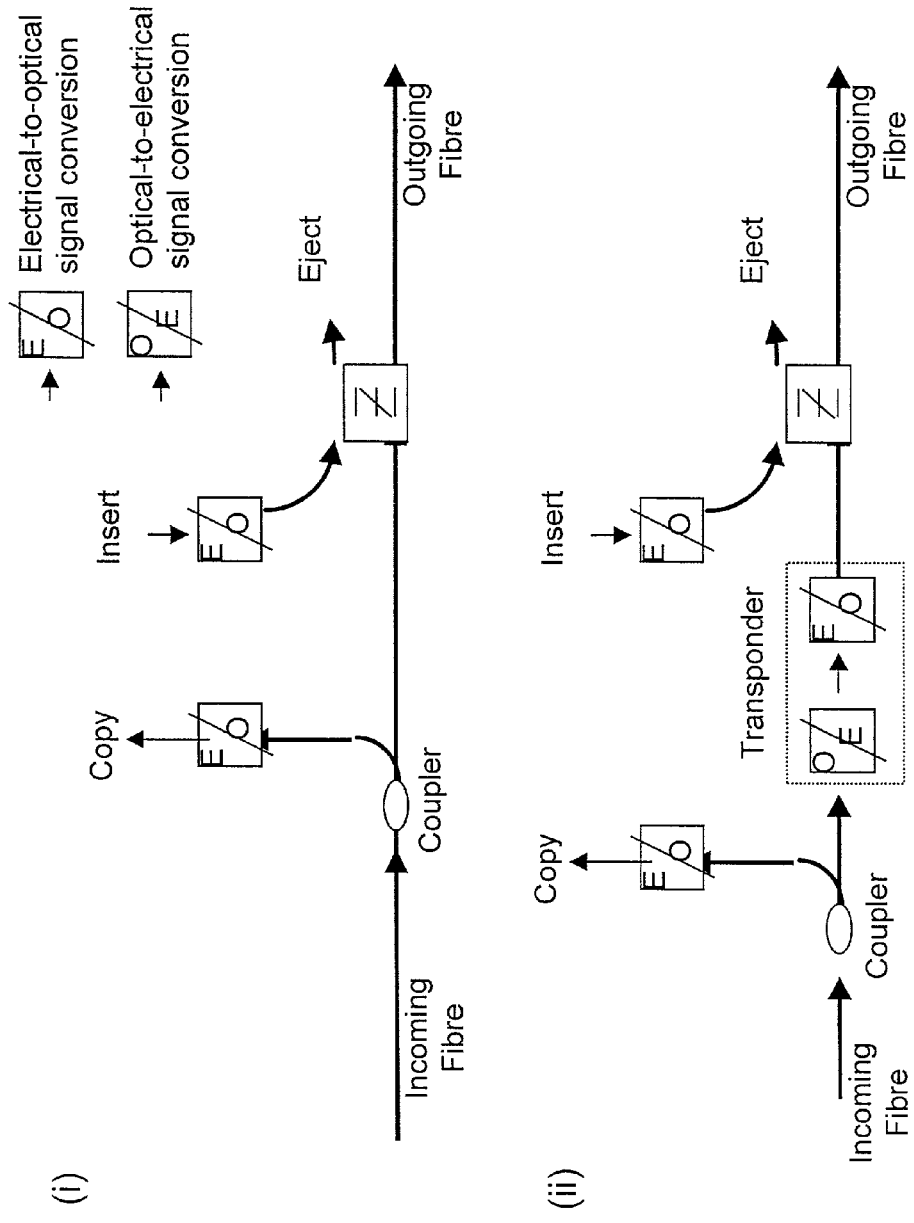
FIGS 7i to 7iv show alternative configurations for the node of FIG. 5.

In the CEI architecture the continuous transmission path for express transit packets is preferably a continuous optical transmission path, but not necessarily so, as shown in FIGS. 7i)–(iv). FIG. 7(i) shows a preferred arrangement with a continuous optical transmission path for express transit packets. FIG. 7(ii) shows a transponder (a regenerator using optical-electrical and electrical-optical conversion states). FIG. 7(iii) shows a case where the copy function is performed in the electrical domain. FIG. 7(iv) shows a case where the copy, eject and insert functions are all performed in the electrical domain. In this case the switch can be a 1×2 electrical switch, and as in the case of optical switching, the channel left open circuit is in effect 'ejected'.

FIG. 7(iv) is distinguished from conventional nodes by a 'continuous transmission path'. In the continuous transmission path signals stream into and out from the path at a continuous and uniform rate.

Figure 8:
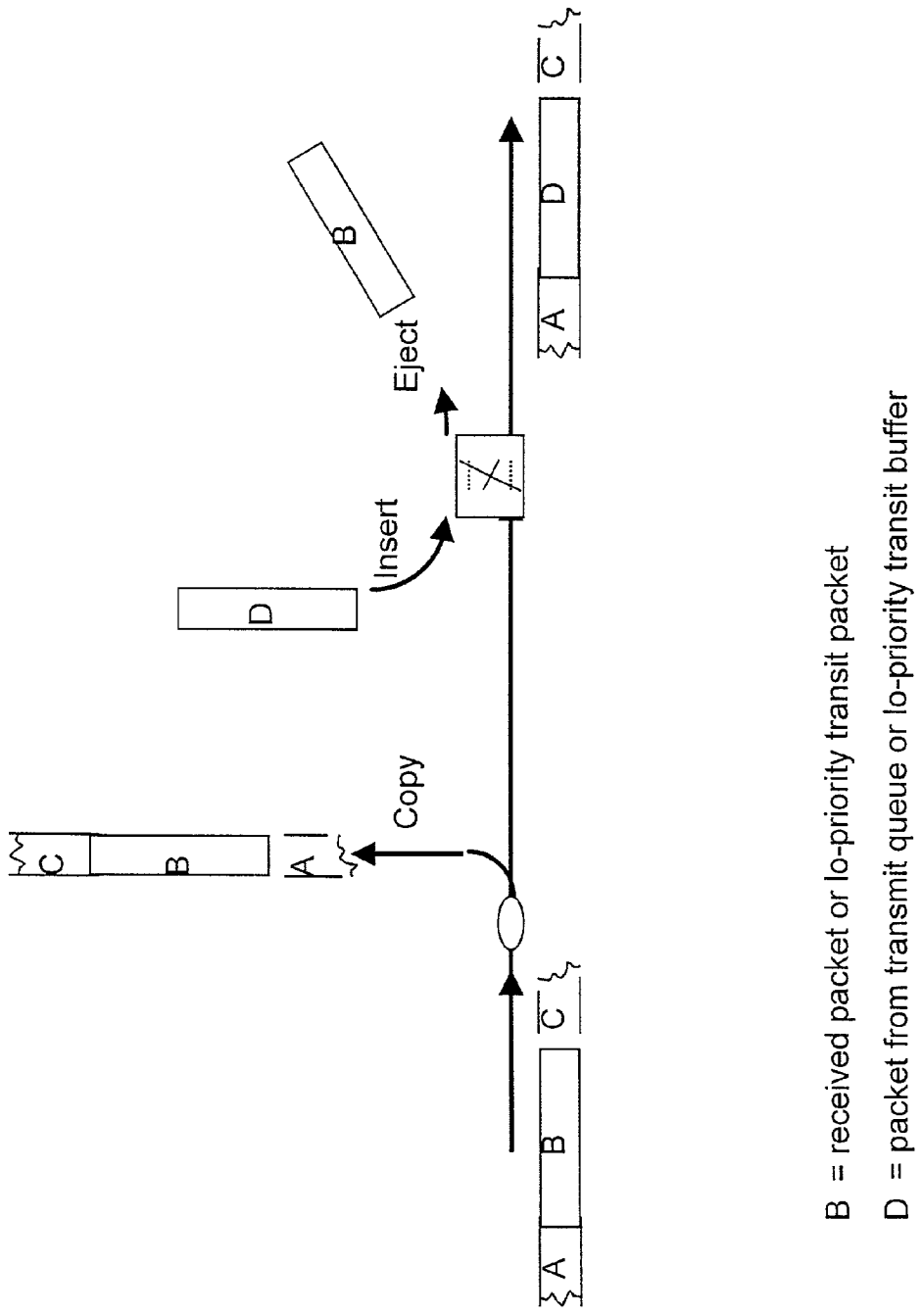
FIG. 8 illustrates the substitution of a high priority packet or a low priority packet.

An important feature of an optical packet network with different priority classes is the ability to reallocate the time occupied on the ring by a transit packet to another packet with higher priority. The reuse of certain time slots using a D&I optical node architecture is previously known. For example, the previously cited paper of Sauer et al describes a D&I optical node in which a slot made vacant by dropping a packet (i.e. removing from the optical ring a packet when the packet destination address matches the node address) can be immediately reused by inserting a transmit packet. Here, distinctively, we reallocate any time slot by ejecting an incoming packet from the ring so as to vacate the time slot, and immediately or simultaneously insert into the same time slot another packet taken from one of the transit or transmit queues. Using the CEI architecture, the steps required to reallocate to a packet of higher priority a time slot currently occupied by an incoming transit packet are: copy the incoming transit packet; determine its priority; if appropriate for reallocation, then do {eject the packet from the ring; deliver the packet copy to the transit buffer; transmit another packet of higher priority reusing the same time slot}. This is illustrated in FIG. 8. Notice that the CEI architecture is not essential for this process. For example, using a D&I architecture the steps required would be: determine the priority of an incoming transit packet; if appropriate for reallocation, then do {drop the packet; store the packet for later transmission; and transmit another packet of higher priority reusing the same time slot}. Another reference is made here to 'slot', this feature is equally applicable to unslotted systems in which packets arrive asynchronously, and may be of variable length.

Figure 9:
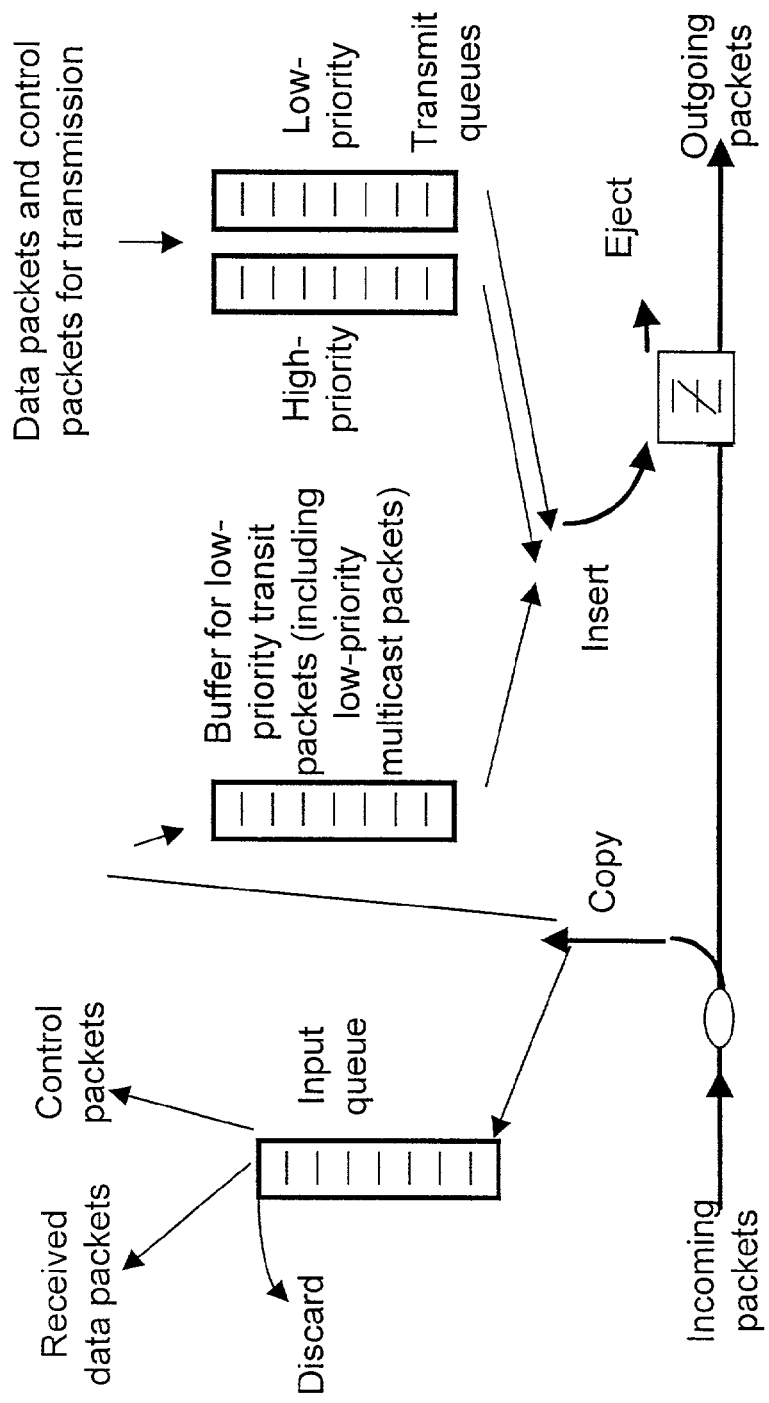
FIG. 9 shows data files within a node for different packet types.

FIG. 9 shows the flow of incoming and outgoing packets in the optical CEI node of FIG. 5, so as to realise the architecture of FIG. 3. All packets are assumed to be in one of two priority classes: low and high (express). Packets may also be unicast or multicast, and they may be data packets (with a payload of user data) or control packets (uniquely for network control purposes). All incoming packets are copied, whereupon they may be allocated to various input queues or else discarded. The operations at the node to handle different types of legitimate (e.g. non-expired) incoming packet are as follows:

Unicast

Express transit packet: The crossbar switch is put in the bar (straight through) state so that the packet is passed directly to the outgoing fibre. The packet copy is discarded.

Express packet addressed to node: The crossbar switch is put in the cross state to eject the packet from the ring. The packet copy is delivered to the input queue, and subsequently sorted according to whether it is a data or control packet.

Low-priority transit packet: The crossbar switch is put in the cross state to eject the packet from the ring. The packet copy is delivered to the low-priority transit buffer.

Low-priority packet addressed to node: The crossbar switch is put in the cross state to eject the packet from the ring. The packet copy is delivered to the input queue, and is subsequently sorted according to whether it is a data or control packet.

Multicast

Express packet (different source): The crossbar switch is put in the bar state so that the packet is passed directly to the outgoing fibre. The packet copy is delivered to the input queue, and is subsequently sorted according to whether it is a data or control packet intended for delivery to the node, otherwise it is discarded.

Express packet (node is the source): The crossbar switch is put in the cross state to eject the packet from the ring. The packet copy is discarded.

Low-priority packet (different source): The crossbar switch is put in the cross state to eject the packet from the ring. The packet copy is delivered to low-priority transit buffer. The packet copy is also delivered to the input queue, where it is subsequently sorted according to whether it is a data or control packet intended for delivery to the node, otherwise it is discarded.

Low-priority packet (node is the source): The crossbar switch is put in the cross state to eject the packet from the ring. The packet copy is discarded.

Packet for transmission from the node are selected from the low-priority transit buffer or the transmit queues according to the current status of queue depths, appropriate rate controls, fairness algorithm, etc. Subject to these controls, packets are transmitted as vacant capacity becomes available on the ring (either vacant capacity on the incoming fibre or new vacant capacity created by the ejection of packets from the ring by the node itself).

Figure 10:
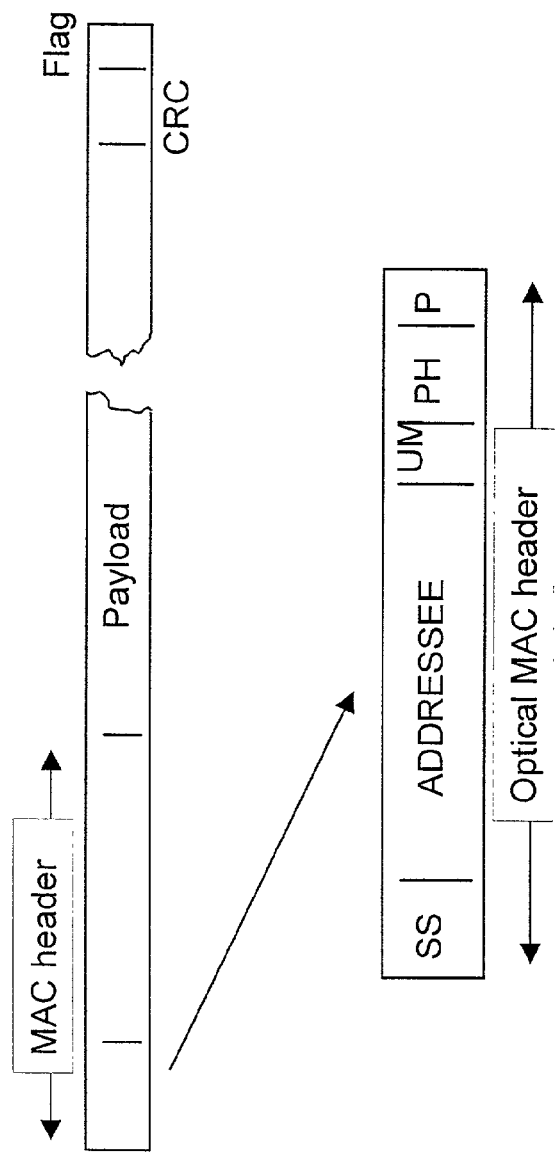
FIG. 10 shows the format of an optical packet.

Each packet carries an appropriate MAC protocol header, designed according to the principles set out earlier (FIG. 10 shows a suggested example). This MAC header can consist of two parts: one part (which we call the 'optical MAC header') contains the minimum information needed for the processing functions that must be carried out at high speed 'on the fly' to enable the operations listed above. The second part of the MAC header contains information needed for other Layer 2 functions.

In the example shown in FIG. 10, SS (self-synchronisation) is a 2-bit field used for timing recovery. ADDRESSEE is a 10-bit field used to indicate which node should strip the packet from the ring. In the 'Spatial Reuse Protocol' (SRP) described by Cisco (part of the Dynamic Packet Transport), packets are stripped from the ring by the destination node in the case of unicast packets. It is proposed here that for the purpose of routing in the high-speed network, the optical MAC header will not include both the source and destination addresses, but instead will contain a single address field ADDRESSEE. For the transmission of a unicast packet, ADDRESSEE will be set to the destination address. For the transmission of a multicast packet, ADDRESSEE will be set to the source address. A node is required to eject a packet from the ring if ADDRESSEE matches the address of the node. UM (unicast/multicast) is a 1-bit field used to indicate whether the packet is unicast or multicast. PH (phase) is a 2-bit field with a dual purpose; as described more fully below, PH indicates the priority of the packet and also contains a simple time-to-live mechanism. P (parity) is a 1-bit field used to set the parity of the optical MAC header (approximately 2 bytes), and will be used in combination with 'on the fly' parity checking to provide some header integrity.

The reading of the optical MAC header must be performed 'on the fly' using very simple high-speed logic operations. For ultra-high-speed optical implementation, processing based on simple optical logic gates, such as AND, will be used. Various methods of timing recovery based on self-synchronisation are described in our patent EP-B-687370. For example, the field SS could consist of 2 return-to-zero format optical pulses separated by 1.5 bit periods, and self-synchronisation would be based on the output from an optical AND gate whose first input is a copy of the packet and the second input is a further copy of the packet delayed by 1.5 bit periods with respect to the first. The output from the AND gate is an optical pulse in precise synchronism with the start of the packet. This pulse (which we term here the 'timing pulse') can then be used for a variety of operations on the fly. The timing pulse may be used in the process of determining whether there is a match between ADDRESSEE and the address of the node, as described in our patent EP-B-687370. The timing pulse may also be used in combination with optical AND gates to read the fields UM and PH.

Figure 11:
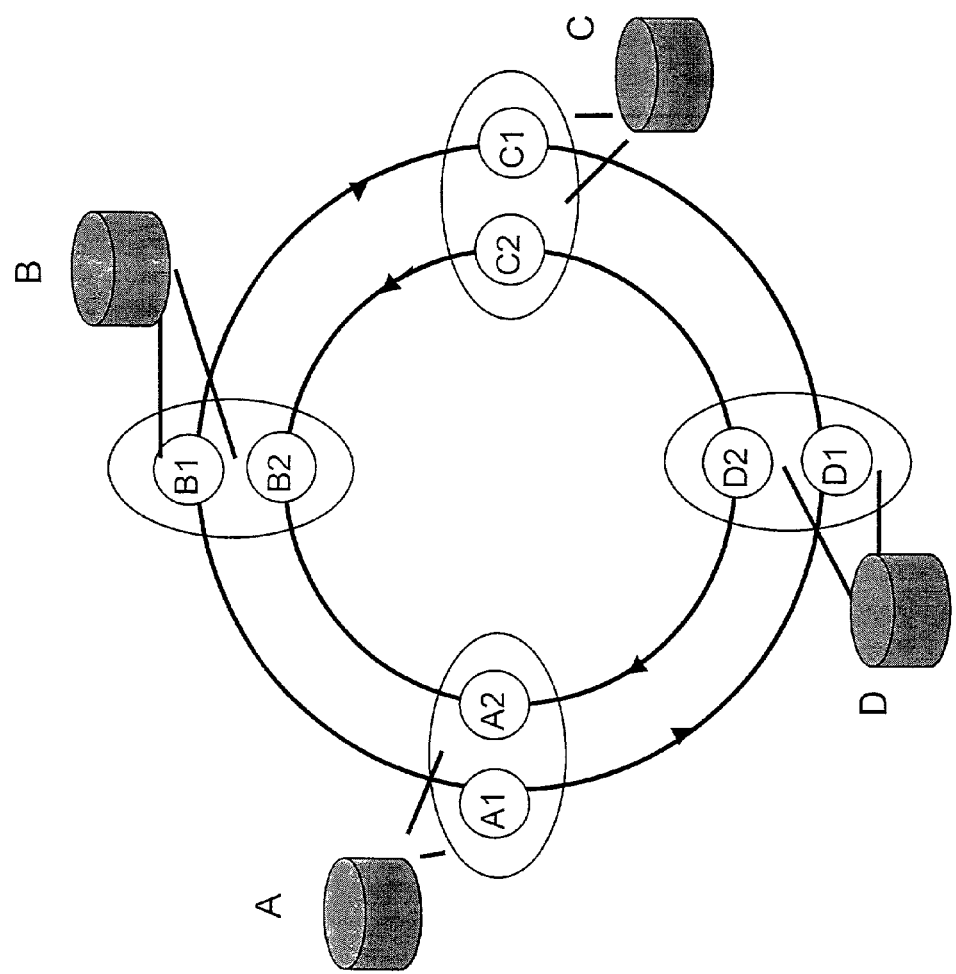
FIG. 11 shows the use of dual addresses.
Figure 12:
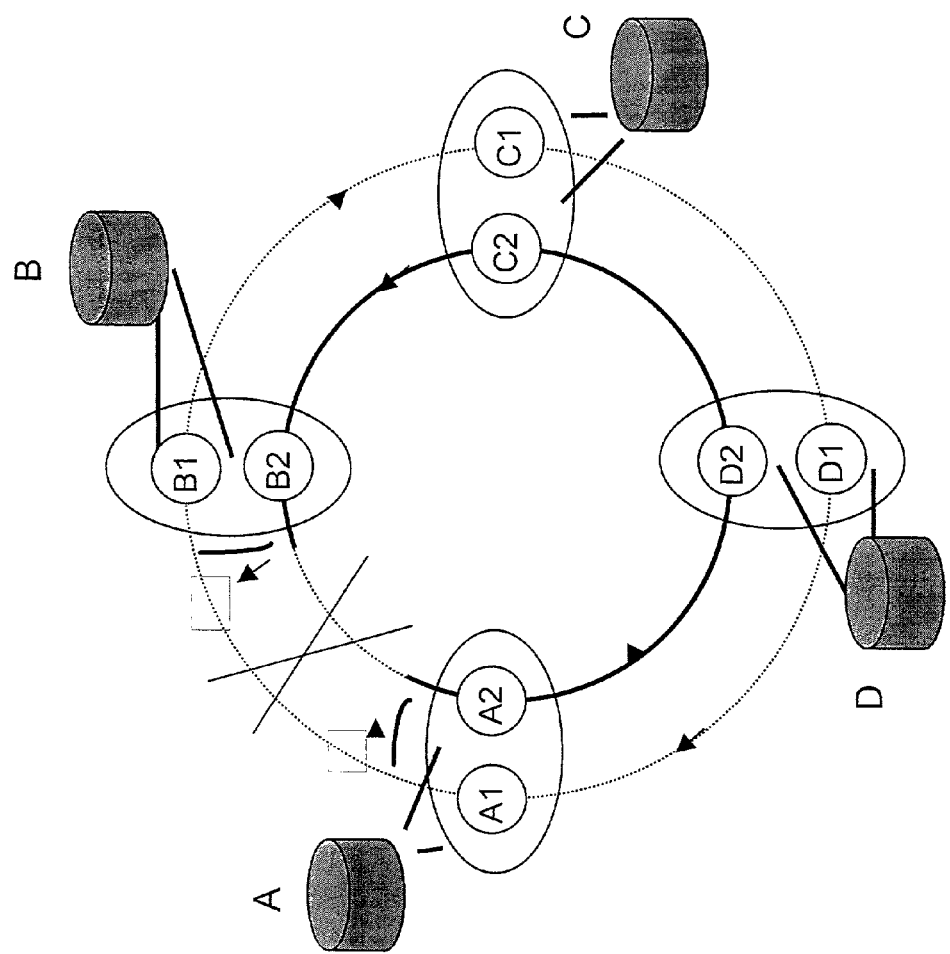
FIG. 12 shows a ring-wrap operation.

The dual ring structure is resilient because, in the event of an isolated fibre break or node failure, the nodes can perform the 'ring wrap' operation illustrated in FIG. 12 [as described for example in Cisco's recently published white paper on Dynamic Packet Transport Technology and Applications]. For proper operation of the control mechanisms which allow the network to reconfigure and re-establish after ring wrap, it is clearly necessary for the nodes to distinguish between those incoming packets which are travelling on their 'correct' ring and those that have been wrapped onto their 'wrong' ring. Here we propose the technique of 'dual addressing' to avoid the need for an additional header field to indicate the 'correct' ring for each packet. Dual addressing is illustrated in FIG. 11. Rather than provide each node with a single address, it is proposed to provide each node with two addresses, one for each of the rings. In this case, the transmitter of a packet uses the appropriate value of ADDRESSEE corresponding to the ring that is being used. In the event of ring wrap, the usual rule for packet stripping is simply followed (a node is required to eject a packet from the ring if ADDRESSEE matches the address of the node), without the need to read further header fields to check whether the packet has been wrapped onto the 'wrong' ring.

Some network control operations require point-to-point signalling between adjacent nodes. This can be done in a number of ways: creation of an independent control packet; 'piggy-back' technique such as overwriting certain fields in a newly created data packet or in a low-priority transit packet; or out-of-band signalling. Out-of-band signalling could be performed in time guard bands between packets.

Figure 13:
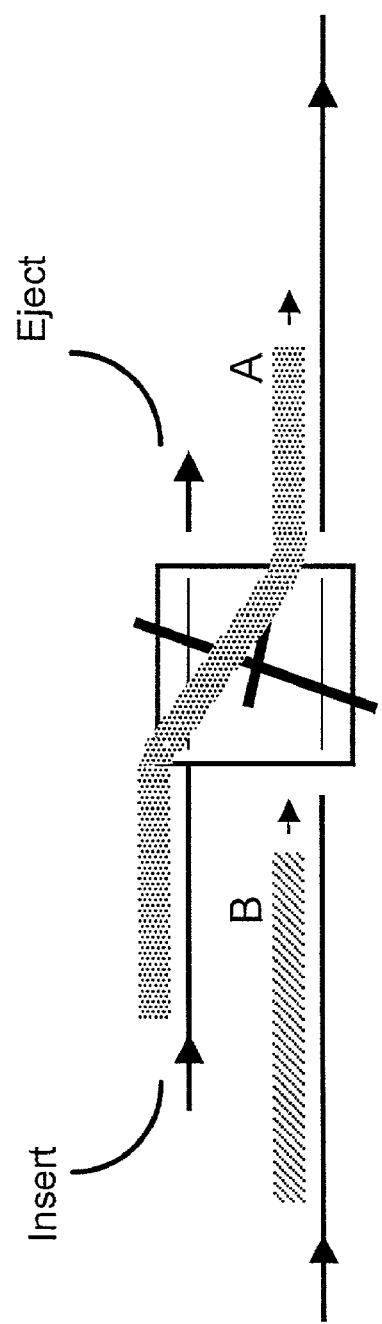
FIG. 13 shows contention at a node output.

A potential limitation of the CEI node architecture is the possibility of contention at the eject-and-insert switch. This is illustrated in FIG. 13. Contention may arise when an incoming packet B arrives when the switch is in the cross position and the node is in the process of inserting a packet A. In the absence of an optical buffering mechanism, various possibilities for contention resolution are available including switch over to the bar state to allow B to pass, thus forcing the ejection of part of A. Resend A later. The recipients of A will recognise that the packet has been truncated, and discard it.

Figure 15A:
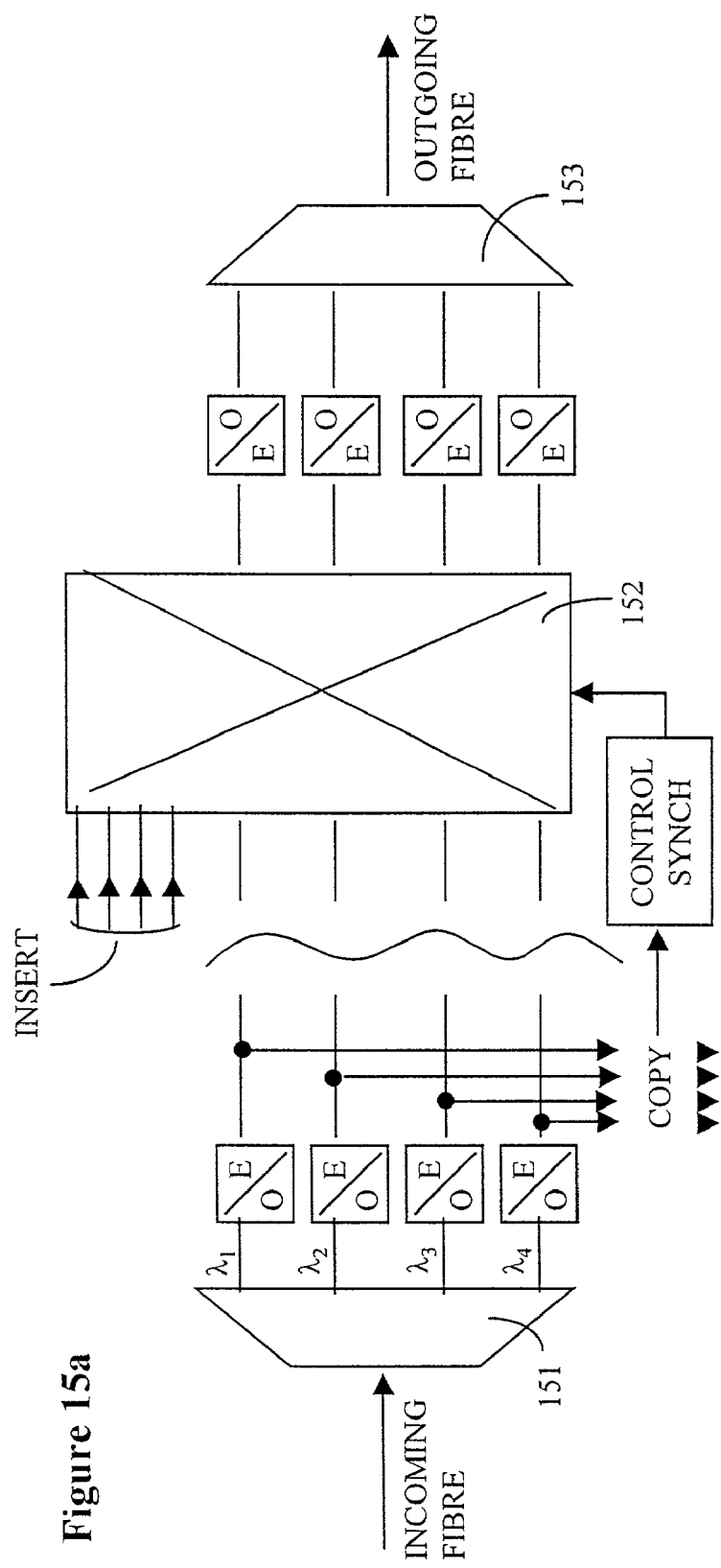
FIG. 15a shows the structure of a node used to switch wavelength division multiplexed optical packets.
Figure 15B:
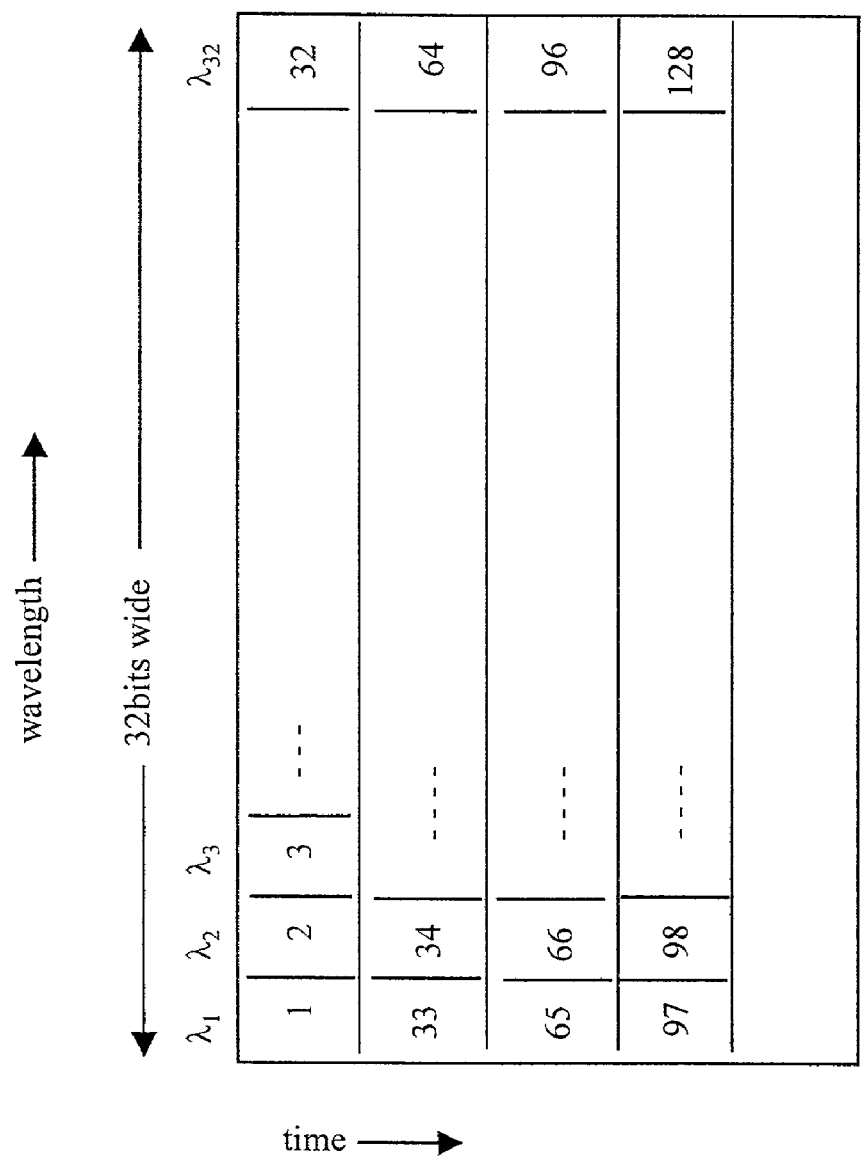

A node embodying the present invention may also be used in a network employing wavelength division multiplexing. FIG. 15a shows one example of such a node. A wavelength division multiplexed packet on the incoming fibre passes to a wavelength division demultiplexer 15. Suitable wavelength division multiplexers are available commercially and may be formed, for example, from wavelength-selective optical couplers or from a fibre Bragg grating. The demultiplexer 151 outputs different wavelength channels on different output fibres. For ease of illustration, only four wavelength channels, $\lambda 1 - \lambda 4$ are shown, but in practice, a greater number of wavelength channels, for example 8, 16 or 32 channels may be used. The optical signal on each wavelength channel is passed through an opto-electronic converter, such as a photodiode, and is converted to a signal in the electrical domain. The outputs from the opto-electronic converters are tapped to provide the copy of the packet. The copy may be passed to the host receive queue and to control/synchronisation circuits, as described previously in relation to the other embodiments. The outputs of the opto-electronic converters are also connected via an electrical continuous-flow path to the input of an electronic switch 152. A parallel datastream of signals to be inserted into the flow path are also input to the switch 152. The parallel outputs of the switch 152 pass through electro-optic converters and are converted back into the optical domain at different respective wavelengths $\lambda 1$–$\lambda 4$. The signals at the different wavelengths are combined onto the outgoing fibre by an optical multiplexer 153. FIG. 15b shows the format of the optical packets as received on the incoming fibre and as output on the outgoing fibre. In this example, 32 wavelengths are used and the packets are 32 bits wide in the wavelength domain. Bit positions 1, 33, 65, . . . are received at wavelength $\lambda 1$, bit positions 2, 34, 66, . . . at wavelength $\lambda 2$, and so on. In the node, in the input fibre prior to demultiplexing of the WDM packet, the optical signals may be passed through a dispersion-compensating device, such as a length of dispersion-compensating fibre, to realign the different wavelength channels in the time domain so as to correct for the effects of group-velocity dispersion in the optical network.

What is claimed is:

1. A method of operation a node (3a–3g) in a communications network (1), the node (3a–3g) having an input and an output with a continuous flow transmission path therebetween, the continuous flow transmission path including a transmission medium, the method including the steps of:
   (a) receiving an optical packet at the node (3a–3g);
   (b) copying the packet such that there is a first packet and a second packet, the first and second packets being duplicates of one another;
   (c) reading at least part of the first packet to determine if (i) the packet is a transit packet and if (ii) the packet is a high priority packet
   (d) if the first packet is determined to be a transit packet having a high priority, then outputting the second packet from the node via the continuous flow transmission path; and,
   (e) if the first packet is determined to be a transit packet not having a high priority, placing the first packet in a queue for later transmission and objecting the second packet from the transmission medium.

2. A method as claimed in claim 1, including the further step of:
   (f) if the first packet is determined to be addressed to the node (3a–3g), ejecting the second packet from the transmission medium, and receiving the first packet for storage and/or processing at the node.

3. A method as claimed in claim 1 or claim 2, wherein the continuous flow path is an optical path.

4. A method as claimed in any preceding claim, wherein the priority of a packet is determined from a flag carried with the packet.

5. A node (3a–3g) for use in a communications network, the node having:
   (a) an input and an output with a continuous flow transmission path therebetween, the continuous flow transmission path including a transmission medium, the input being adapted for receiving an incoming optical packet;
   (b) copying means (5.1) for copying the incoming packet such that there is a first packet and a second packet, the first and second packet being duplicates of one another
   (c) processing means arranged to (i) read the first packet, (ii) determine whether a packet is a transit packet, and (iii) determine whether a packet is a high priority packet; and,
   (d) control means which, in response to the processing means determining that the first packet is a transit packet having a high priority, are arranged to direct the second packet to the output of the node via the continuous flow transmission path, the control means being further arranged to, in response to the processing means determining that the first packet is a transit packet not having a high priority, (i) eject the second packet form the transmission medium and (ii) to place the first packet in a queue for later transmission.

6. A node (3a–3g) according to claim 5, further comprising a wavelength demultiplexer (151) connected to the input to the node and arranged to demultiplex a wavelength-multiplexed packet received at the input to the node, and a wavelength multiplexer (153) connected to the output of the node and arranged to multiplex a plurality of wavelength channels to form a wavelength division multiplexed optical packet for transmission from the output of the node.

7. An optical communications network (1) including one or more nodes according to claim 5.

8. An optical communications network (1) as claimed in claim 7, wherein the network has a ring topology.

9. A method of operating a node (3a–3g) in a communications network (1), the node (3a–3g) having an input and an output with a continuous flow transmission path therebetween, the continuous flow transmission path including a transmission medium, the method including the steps of:
   (a) receiving an optical packet at the node (3a–3g);
   (b) copying the packet such that there is an original packet and a copy packet, the original and the copy packets being duplicates of one another;
   (c) copying the copy packet such that there is a first copy packet and a second copy packet
   (c) reading at least part of the first copy packet to determine if (i) the packet is a transit packet and if (ii) the packet is a high priority packet
   (d) if the first copy packet is determined to be a transit packet having a high priority, then outputting the original packet from the node via the continuous flow transmission path; and,
   (e) if the first copy packet is determined to be a transit packet not having a high priority, placing the second copy packet in a queue for later transmission and ejecting the original packet from the transmission medium.

10. A method of operating a node (3a–3g) as claimed in claim 9, including the further steps of:
   (f) if the first copy packet is determined to be addressed to the node (3a–3g), ejecting the original packet from the transmission medium, and receiving the second copy packet for storage and/or processing at the node.

* * * * *